United States Patent [19]
Leblanc

[11] 3,897,636  
[45] Aug. 5, 1975

[54] WHEEL ALIGNMENT METHOD AND APPARATUS

[76] Inventor: Joseph V. Leblanc, 102 N. Delmont East, Conroe, Tex. 77301

[22] Filed: Nov. 14, 1973

[21] Appl. No.: 415,518

[52] U.S. Cl. .............................. 33/203.13; 73/177
[51] Int. Cl. ........................................... G01b 7/30
[58] Field of Search........... 33/203, 203.12, 203.13, 33/203.14; 73/117

[56] References Cited
UNITED STATES PATENTS

| | | | |
|---|---|---|---|
| 1,665,252 | 4/1928 | Buckert et al. | 33/203.13 |
| 2,114,481 | 4/1938 | Taber | 33/203.13 |
| 2,270,230 | 1/1942 | Pearce | 33/203.13 |
| 3,305,935 | 2/1967 | Cady et al. | 33/203.13 |
| 3,643,337 | 2/1972 | Dick | 33/203.13 |

*Primary Examiner*—William D. Martin, Jr.
*Attorney, Agent, or Firm*—Bard & Springs

[57] ABSTRACT

In one exemplar embodiment, a wheel alignment apparatus is provided for aligning the front wheels of a motor vehicle to have a parallel track while rotating the wheels at an rpm equivalent to normal highway speed. The motor vehicle is oriented on a ramp on a horizontal surface. Means are provided for indicating any difference in the relative caster of the front wheels and the caster is then adjusted to a common value. The wheels are placed in contact with a pair of spaced drums mounted for rotation on a drive shaft and adapted for limited lateral movement. Means are provided for securing the motor vehicle in a fixed position with the axis of the front wheels vertically aligned over the drum drive shaft. The drums are rotated to drive the wheels at a normal highway speed and a force measuring means interconnecting the spaced drums detects side thrust forces exerted on the spaced drums by the rotating wheels for indicating any divergence from parallel of the track of the front wheels. The track of the front wheels can then be adjusted until the force measuring means indicates that the track is parallel, under dynamic conditions approximating normal highway driving speeds.

13 Claims, 8 Drawing Figures

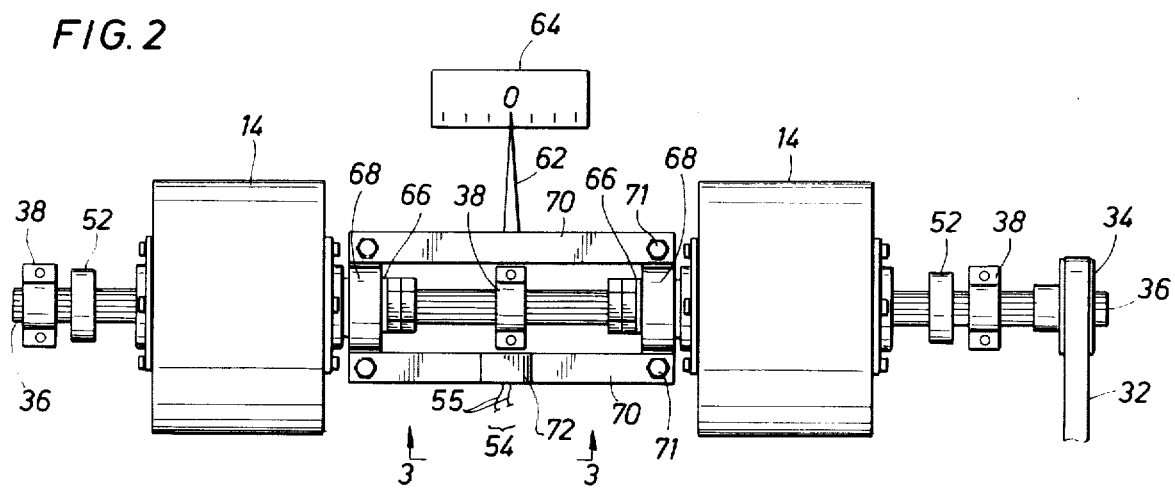
FIG. 2
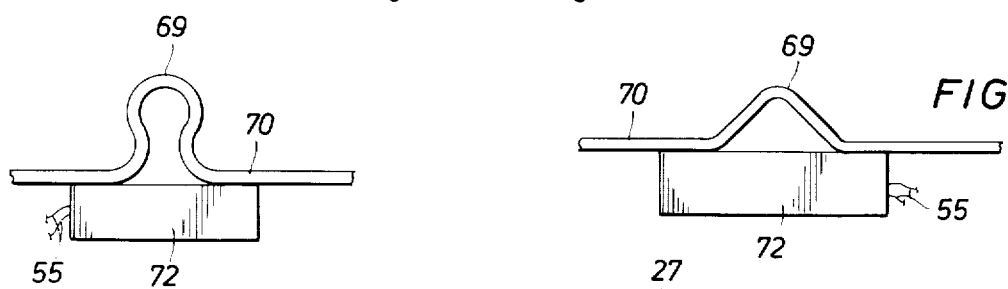
FIG. 3A
FIG. 3B
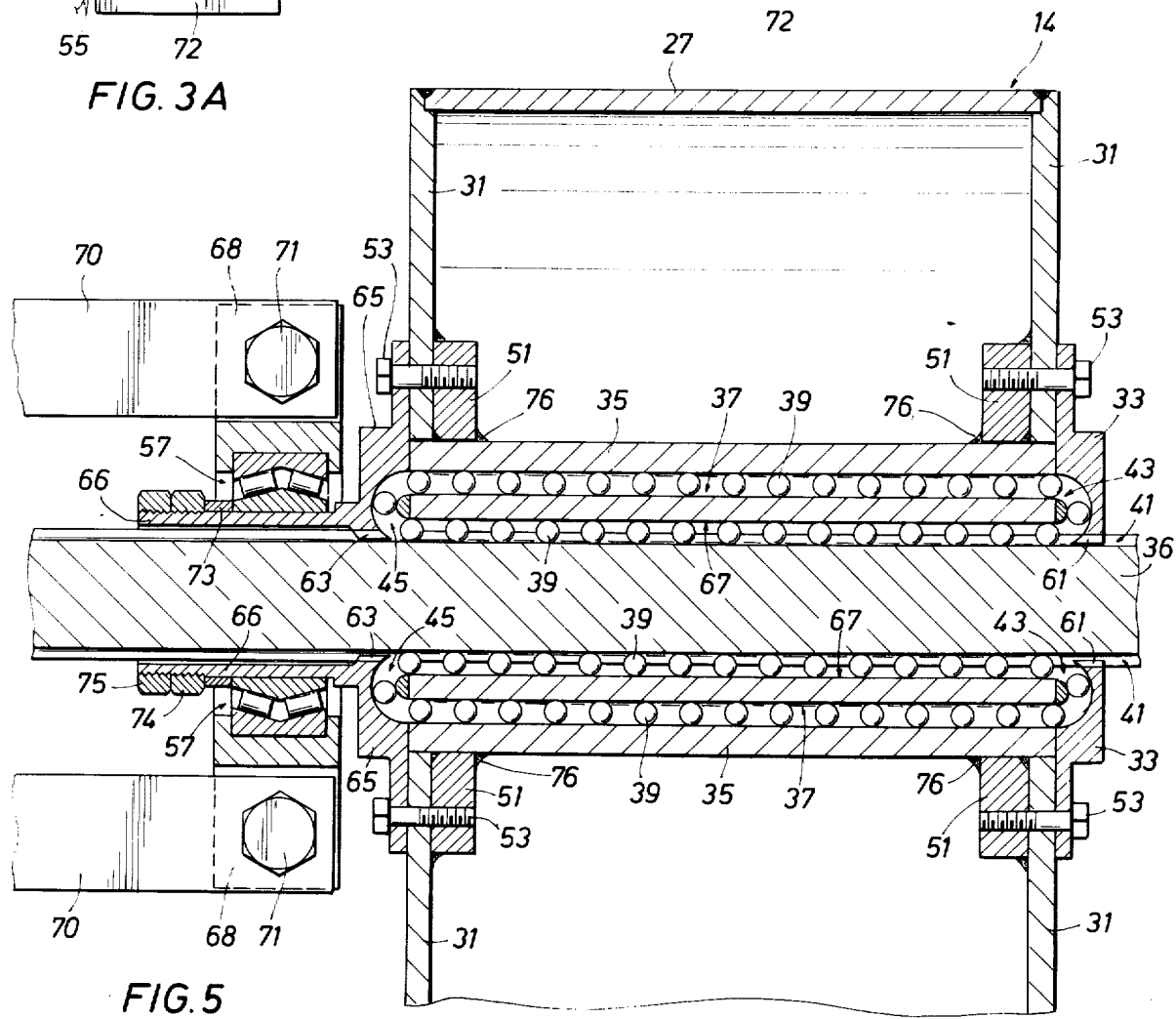
FIG. 5

WHEEL ALIGNMENT METHOD AND APPARATUS

BACKGROUND OF THE INVENTION

This invention relates to wheel alignment procedures and apparatus and particularly to procedures and apparatus for paralleling the track of the front wheels of a motor vehicle at highway speeds. Static measurements are not considered.

It is conventional practice to perform a wheel alignment on a motor vehicle under static conditions. The camber, caster and toe-in or toe-out of the front wheels is adjusted with the wheels static. In theory, the camber, caster and toe-in or toe-out adjustments, under static conditions, will change under dynamic conditions, depending on the geometry of the vehicle front end and the suspension, in order that the track of the front wheels is parallel at the average road speed for the vehicle. It is desirable for the track of the wheels to be parallel in order that side thrust forces on the wheels are eliminated to enhance steering control and lengthen tire life. However, the adjustments for camber, caster and toe-in or toe-out are specified by the vehicle manufacturer without regard to the average speed driven by the particular vehicle. The manufacturer's specifications for toe-in or toe-out are for adjusting under static conditions, assuming that the track of the wheels will be parallel at some undetermined driving speed. However, for each vehicle, no one knows at what speed of the vehicle the track of the wheels will become parallel, or that the track will ever become parallel.

In the prior art there are many devices which may be attached to the steering mechanism of the motor vehicle which would detect changes in camber, caster, toe-in or toe-out and indicate the change or deviation from a specified static condition alignment of the steering geometry of the motor vehicle. However, these devices are intended to indicate and alert the driver when such an anomalie in the steering geometry occurs. The driver would then have to take the motor vehicle to a mechanic and have the front end steering geometry aligned in accordance with the manufacturer's specifications under static conditions. One of the greatest problems is in the adjustment of toe-in or toe-out for a vehicle. As mentioned above, the toe-in or toe-out is set for a vehicle under static conditions in accordance with the manufacturer's specifications. But there is no guarantee or certainty that the steering geometry of the vehicle will provide a parallel track for the front wheels under the dynamic conditions at which the vehicle is normally operated.

A patent to Sakamoto, U.S. Pat. No. 3,453,740, discloses apparatus for checking the wheel alignment of an automobile. The wheels are rotated and the apparatus measures various steering geometry parameters which must be calculated from various formulas. The apparatus and calculations are complex and no specific provisions are made for directly indicating a parallel track alignment of the front wheels under dynamic conditions.

Accordingly, one primary feature of the present invention is to detect side thrust forces acting on the front wheels of a motor vehicle under dynamic conditions which will indicate any divergence from parallel of the track of the front wheels.

Another feature of the present invention is to rotate the front wheels of the motor vehicle at a predetermined speed in accordance with normal operating conditions of the vehicle in order that the parallel track of the wheels may be adjusted under dynamic conditions approximating normal road conditions.

Yet another feature of the present invention is to provide means for positioning the axis of the front wheels vertically over the axis of the wheel rotating means in order to eliminate any effects of wheel camber on the determination of parallel wheel tracking.

Still another feature of the present invention is to provide means of indicating a difference in caster of the front wheels of the motor vehicle in order that a caster adjustment can be made to bring both front wheels to the same degree of caster prior to determining the track of the front wheels.

SUMMARY OF THE INVENTION

The present invention remedies the problems of the prior art by providing a pair of spaced drums mounted for rotation on a drive shaft and adapted for limited lateral movement along the drive shaft, the drums adapted to contact the front wheels and rotate the wheels at a predetermined highway speed. Means are provided for securing the motor vehicle in a fixed position with the front wheels in contact with the spaced drums and adjustable to vertically orient the axis of the wheels over the drive shaft of the drums. A connecting means interconnecting the spaced drums is provided and adapted for maintaining the drums in a spaced condition. A force sensing means is attached to the connecting means for detecting any tension or compression forces exerted on the connecting means by the side thrust forces acting on the spaced drums by the rotating wheels and transmitted to the connecting means. An indicator is connected to the sensing means to indicate the tension or compression forces acting on the connecting means for indicating any divergence of the track of the front wheels from parallel. The toe-in, toe-out adjusting sleeve of the front steering arm is then adjusted, while the wheels are rotating at highway speed, until the indicator indicates that zero tension or compression forces exist in the connecting means between the pair of drums, thus indicating that the track of the front wheels is parallel. This results in a parallel track of the front wheels with no side thrust forces at a predetermined wheel rotational speed that closely duplicates actual average road operating speeds for the vehicle.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope, for the invention may admit to further equally effective embodiments.

In the drawings:

FIG. 2 is a plan view of the wheel alignment apparatus.

FIG. 3A is an enlarged partial detail view of one configuration of the drum-connecting bar with attached force measuring means, as taken along lines 3—3 of FIG. 2.

FIG. 3B is an enlarged partial detail view of another configuration of the drum-connecting bar with attached force measuring means, as taken along lines 3—3 of FIG. 2.

FIG. 5 is an enlarged fragmentary detailed cross-sectional view of a drum including the brackets for attachment of the connecting bars.

DETAILED DESCRIPTION OF THE PREFERRED EMBODIMENTS

Figure 1:
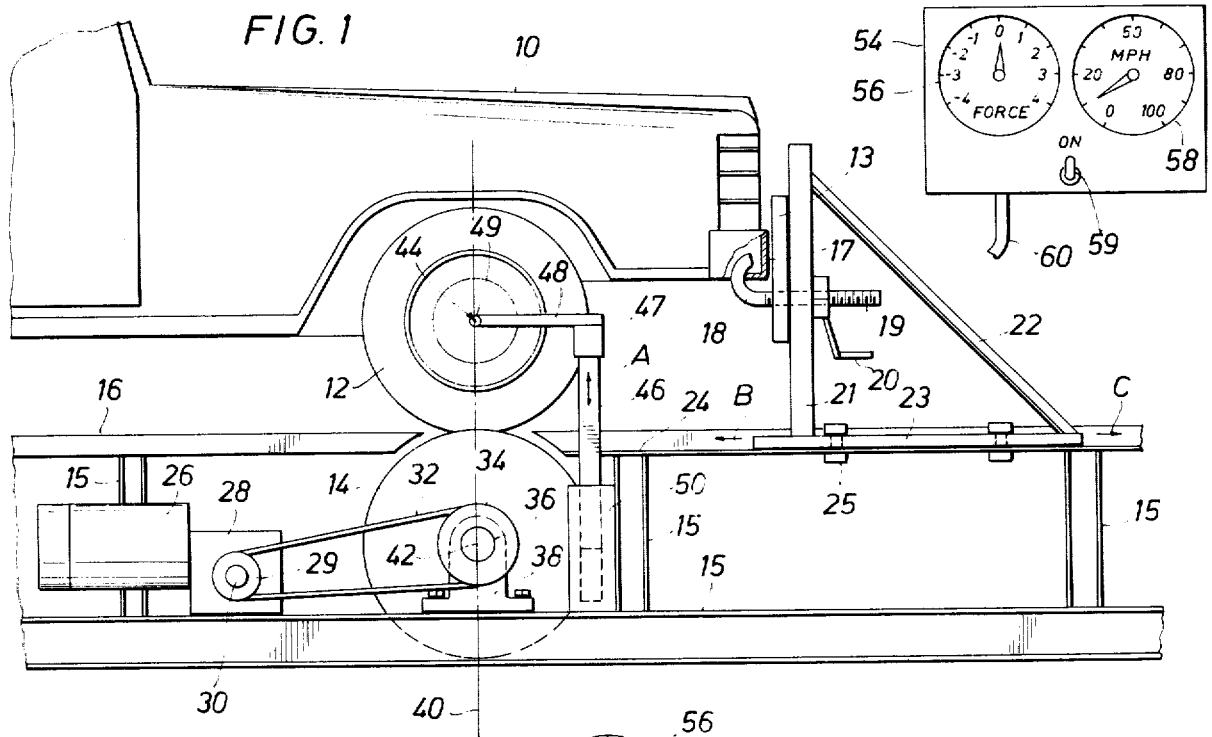
FIG. 1 is a side elevational view of the wheel alignment apparatus with a motor vehicle positioned for proper wheel alignment.

Referring now to FIGS. 1 and 2, a side view of the wheel alignment apparatus with a motor vehicle in proper placement for determining correct wheel alignment is shown. The motor vehicle 10 is shown in place on a horizontal ramp 16, supported by frame members 15, with its front wheels 12 in contact with the surface of drums 14 adapted for rotation about axle or drive shaft 36. A vehicle locking mechanism is shown for engaging motor vehicle bumper 17 for positioning and holding vehicle 10 and wheels 12 in proper position with respect to drums 14. An upright member 21 is mounted on base 23 and supported by brace 22. A pad 13 engages the front surface of the bumper while a J-shaped hook 18 engages the back of the bumper 17, and by means of handle 20 turning on the threaded part 19 of the hook shaft, the bumper 17 can be grasped and engaged for positioning vehicle 10. The base 23 cooperates with a rail 24 by means of guides 25 and can be moved in directions B and C by conventional means (not shown) to correctly position the wheels 12 over drums 14 and prevent any sidewise movement of the vehicle, as will hereinafter be further described.

Drums 14 rotate with axle or drive shaft 36 about axis 42. A motor 26 is provided, driving a gear box 28 having an output drive shaft 30 with an attached drive sheave 29. A driven sheave 34 is attached to drive shaft 36 and is coupled to drive sheave 29 by means of drive belt 32. Pillow blocks 38 support drive shaft 36 for rotation.

To eliminate any effects of unequal caster, the wheels 12 must be positioned such that the wheel axis 44 is positioned in the vertical plane 40 passing through the axis 42 of drive shaft 36. An indicating means is provided for indicating the correct location of the wheel axis 44 with respect to the drum drive shaft axis 42. The indicating means comprises pointer 49 (see also FIG. 4B) mounted for limited horizontal movement on arm 48 which is fixed to cap 47. Cap 47 is adapted for removable engagement with the end of shaft 46 which may be moved vertically up or down as shown at A in shaft base 50. Conventional securing means (not shown) may be employed to hold shaft 46 at the desired height.

In operation, motor vehicle 10 is engaged by hook 18 and base 23 is moved to position wheels 12 until pointer 49 coincides with the axis 44 of wheels 12, movement of the base 23 along the rail 24 is stopped and base 23 is locked by conventional means (not shown) to hold vehicle 10 in place. Since arm 48 is sized to place pointer 49 coincident with plane 40 passing through axis 42 of shaft 36, the proper placement of axis 44 of wheels 12 will occur when the axis 44 and pointer 49 coincide. If the pointer 49 of one of the pairs of pointers does not coincide with the axis of one of the wheels, this is an indication that there is an unequal degree of caster in wheels 12, which should then be adjusted to an equal value in order that pointers 49 and axis 44 of the wheel axles coincide.

Attached separately is an instrument panel 54 that is provided to give necessary readings and information to the vehicle mechanic. Panel 54 mounts a force indicator gauge 56 and a wheel speed gauge 58. An OFF-ON switch 59 is provided to turn the equipment "on" and "off". An electrical cable 60 connects the gauges 56 and 58 with the appropriate mechanisms of the wheel alignment apparatus. The wheel speed gauge 58 indicates in MPH the speed of the wheels 12 as driven by drums 14. Motor 26 is a variable speed motor and may be adjusted to drive drums 14 and wheels 12 at any desired speed to simulate actual vehicle highway speed. The force indicator gauge 56 indicates the force between the two drums 14, as will hereinafter be further explained, which indicates a toe-in or toe-out condition of the front wheels 12.

As can better be seen in FIG. 2, the drums 14 are mounted on axle 36 and are adapted for limited lateral movement along shaft 36 between stops 52, as will be hereinafter further described. A pair of sleeves 66 encircling drive shaft 36 are attached to drums 14 for rotating therewith. A pair of brackets 68 are provided, each journaled on one of the sleeves 66 to allow the sleeve 66 to rotate within the bracket 68, as will hereinafter be further described. Bars 70 connect the spaced brackets 68 and hold the brackets 68 fixed with relation to the rotation sleeves and maintain the drums 14 in a spaced condition. Bars 70 are fastened to brackets 68 by means of bolts 71. A pointer 62 is attached to one bar 70 for indicating on a scale 64, attached to the ramp frame 15, when the drums 14 are positioned in the center of their lateral travel. A force measuring means 72 is attached to one of bars 70 for measuring the tension or compression in bar 70, thereby indicating the side thrust forces exerted between the spaced drums 14 by the rotating wheels, as will hereinafter be further described. Electrical leads 55 transmit signals from the force measuring means 72 to force indicator gauge 56.

FIGS. 3A and 3B illustrate the attachment of the force measuring means 72 to bar 70. Bar 70 has a bend or curve 69, and force measuring means 72 is attached across the curve or bend 69 to detect any side thrust forces exerted between the rotating drums 14 and transmitted to bar 70. Force measuring means 72 may be a conventional strain gauge bonded to bar 70 or it may be a hydraulic sensing means for sensing tension or compression in bar 70. The electrical strain gauge is preferred over the hydraulic sensing means, however, since it is cheaper, simpler and longer lived, being practically maintenance free, and measures very minute elongation or compression of the bar 70.

FIG. 5 is a partial or fragmentary cross-section of a drum 14. Each drum 14 comprises a drum cylinder 24 fitted to side plates 31. Side plates 31 are fitted to a drum bearing race 35 which is slipped over drive shaft 36. An outer hub 33 is bolted to side plate 31 by means of conventional fastening means, such as bolts 53 which attach to a flange ring 51 disposed in the interior of the drum and fixed to race 35 by means of a weld joint 76. An inner hub 65 carrying sleeve 66 is attached to the inward side plate 31 by means of bolts 53 fastening to a flange ring 51 as hereinbefore described for attaching outer hub 33.

A cylindrical bore 37 passes through bearing race 35 and communicates via bores 43 and 45 of outer hub 33 and inner hub 65, respectively, with a bore formed by semi-circular slots 67 in race 35 matching with an indexed semi-circular slot 41 in the surface of drive shaft 36. Disposed in bores 37, 43, 45 and the bore formed by semi-circular slots 67 and 41 are a plurality of ball bearings 39. Ball bearings 39 perform two functions. First, the ball bearings 39 disposed in the indexed semi-circular slots 61 and 41 keep the drum 14 and drive shaft 36 together in order that the drum 14 rotates with the driven shaft 36. Second, the ball bearings 39 provide a means of permitting the drum 14 to move longitudinally along shaft 36 by the circulating action of the ball bearings 39 in the bores 37, 43, 45 and the bore formed by semi-circular slots 67 and 41. Retainers 61 and 63 projecting into semi-circular slots 41 from outer hub 33 and inner hub 65, respectively, retain the ball bearings 39 in the circulating bores hereinbefore described.

The sleeve 66, projecting from inner hub 65, encircles drive shaft 36 and projects inwardly toward the other drum 14 (see FIG. 2). Bracket 68 is journaled on sleeve 66 by means of a beveled cylindrical bearing 57 that allows sleeve 66 to rotate within bracket 68. A spacer 73 and locking nuts 74 and 75 are disposed on the end of sleeve 66 to retain bracket 68 in place on sleeve 66. Bars 70 are attached between the spaced brackets 68 by means of bolts 71 (see FIG. 2) for holding the brackets 68 fixed with respect to the rotating drums 14 and sleeves 68, as hereinbefore mentioned. The bars 70 and brackets 68 form a connecting means interconnecting the spaced drums 14 and are adapted for lateral movement along shaft 36 with the drums 14 and maintain the drums 14 in a spaced condition.

In operation, motor vehicle 10 is driven up on ramp 16 and positioned on a horizontal surface. The front wheels 12 are placed in a straight-ahead alignment in contact with the pair of spaced drums 14. The vehicle 10 is moved until both pointers 49 indicate that both wheels 12 are properly aligned over drums 14. If pointer 49 is correctly aligned for one wheel but not for the other, then a relative difference in caster of the wheels exists. The correct caster must then be determined by conventional means for one wheel and the caster of the other wheel adjusted to equal the caster of the first wheel.

After the caster has been adjusted, the vehicle is repositioned until the pointer 49 indicates that both wheels 12 are aligned in a vertical plane 40 passing through the axis 42 of drive shaft 36 (see FIG. 1). When the caster adjustment is accomplished and the front wheels 12 are vertically aligned over the drive shaft 36, then the wheel alignment procedure can begin. Since the axis 44 of wheels 12 is vertically aligned over axis 42 of drive shaft 36, the effects of the camber of the wheels is negatived during the parralleling of the two front wheels at highway speed. Camber may be properly set for the front wheels at the time the caster of the front wheels is determined and adjusted.

The toe-in or toe-out of the front wheels of a motor vehicle are typically set at static conditions, and it is assumed that at average road speeds the geometry of the front end of the motor vehicle and its suspension will cause the front wheels to assume a parallel track to minimize side thrust forces on the wheels and hence minimize tire wear. In the instant apparatus, however, toe-in or toe-out of the front wheels is not measured or considered. After the wheels are adjusted parallel at average highway speed, the resulting toe-in or toe-out of the front wheels in a static condition will then be the correct toe-in or toe-out adjustment for that particular vehicle.

Figure 4A:
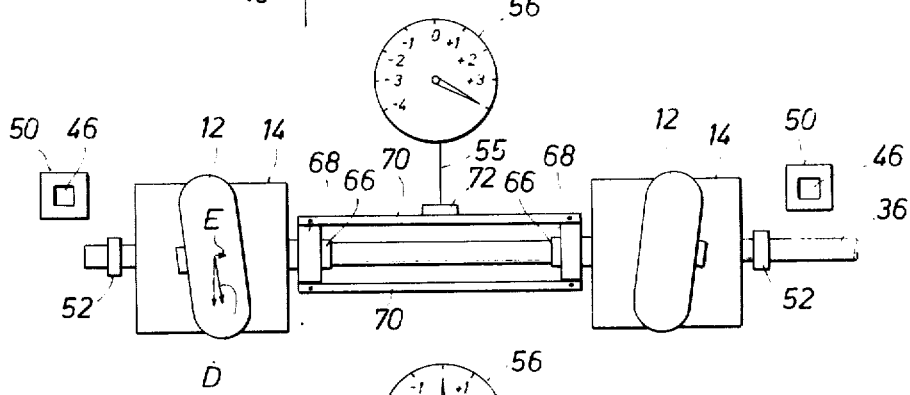
FIG. 4A is a schematic view of the wheel alignment apparatus showing the forces acting on the drums when the wheels have a toe-out alignment.

Referring now to FIGS. 4A, B and C, the dynamic paralleling of the front wheels of the motor vehicle will be explained in greater detail. The drums 14 are rotated until the wheels 12 are rotating at a predetermined speed equivalent to the average road speed at which the motor vehicle normally travels, as indicated by gauge 58 (see FIG. 1). The steering arms of the vehicle are moved until the pointer 62 and scale 64 indicate that the drums 14 are approximately in the center of their lateral travel. If the wheels 12 have a toe-out condition at the predetermined speed as shown in FIG. 4A, then the force acting on the wheel and drum is shown at D with a resulting side thrust force E acting on drums 14 and tending to cause the drums to converge along the drive shaft. Bars 70 interconnect drums 14 and prevent actual convergence of the drums 14, but the side thrust forces depicted at E will be transmitted to bars 70 and cause a compressive force to be exerted on bars 70. Force sensing means or strain gauge 72 detects and measures this compressive force and transmits the measurement via conductor 55 to the force indicating gauge 56. The positive values or readings indicated on gauge 56 indicate a compressive force in bars 70 and indicate a toe-out condition of wheels 12 not parallel.

Figure 4B:
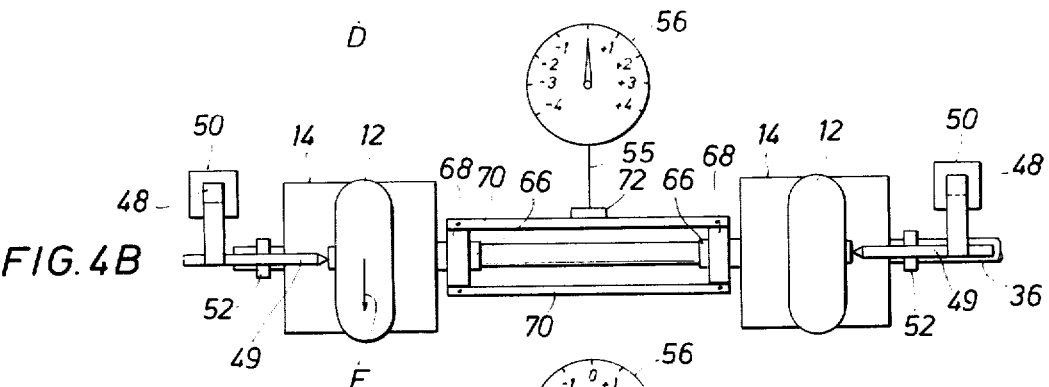
FIG. 4B is a schematic view of the wheel alignment apparatus showing the forces acting on the drums when the track of the wheels is parallel and including the wheel axis alignment indicator apparatus.

Accordingly, the toe-in, toe-out adjustment sleeve of the front wheel tie rod must be adjusted until the track of the rotating wheels 12 is parallel at the predetermined speed, as shown in FIG. 4B, and the force gauge indicates "zero" force acting in bars 70. With the track of wheels 12 adjusted to be parallel at the predetermined speed of the rotating wheels, the force F acts tangentially between rotating drums 14 and wheels 12, and no side thrust forces are created. Since no side thrust forces are created, no compression or tension forces will be present in bars 70 and the force gauge will indicate "zero," the correct setting of wheels at the predetermined speed.

Figure 4C:
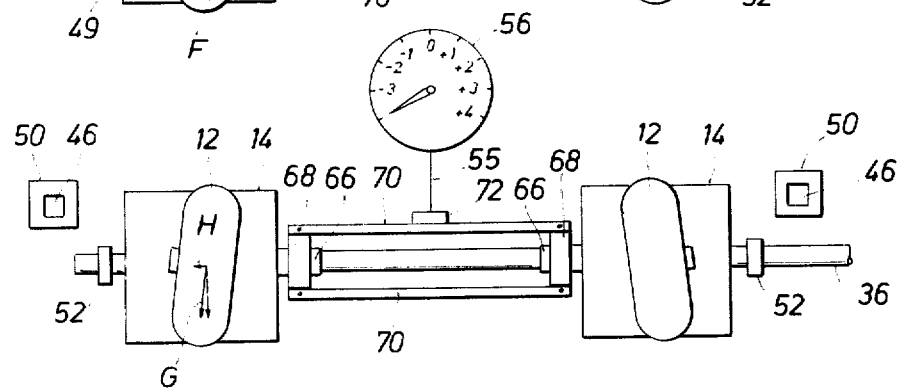
FIG. 4C is a schematic view of the wheel alignment apparatus showing the forces acting on the drums when the wheels have a toe-in alignment.

If the wheels 12 have a toe-in condition at the predetermined speed, as shown in FIG. 4C, then the forces acting on the wheel and drum is shown at G with a resulting side thrust force H acting on drums 14 and tending to cause the drums 14 to diverge along the drive shaft. Of course, bars 70 interconnect drums 14 and restrain actual divergent movement of the drums 14, but the side thrust force H will be transmitted to bars 70 and cause a tensile force to be exerted on bars 70. The force measuring means or strain gauge 72 detects and measures the tension developed in bar 70 and transmits the measurement via conductor 55 to the force indicating gauge 56. The negative values or readings indicated on the gauge 56 indicate a tension force in bars 70 and indicate a toe-in condition of wheels 12. By adjusting the toe-in, toe-out adjustment sleeve of the front wheel tie rod, as hereinbefore mentioned, the track of wheels 12 may be adjusted to parallel with a resulting "zero" reading on gauge 56, as shown in FIG. 4B.

Accordingly, it may be seen that a unique method of determining and adjusting wheel alignment of a motor vehicle is accomplished, comprising the steps of orienting the motor vehicle on a horizontal surface, determining the caster of the front wheels of the motor vehicle, adjusting the caster of the front wheels to a predetermined value, aligning the axis of the relative front wheels vertically over the axis of a wheel driving means, driving the front wheels of the motor vehicle at a predetermined speed, simultaneously determining any divergence from parallel of the track of the front wheels at the predetermined speed, and adjusting the relationship of the front wheels until the track of the wheels is parallel at the predetermined speed.

It will be apparent that setting the toe-in, toe-out of the front wheels to make the track of the front wheels parallel at the predetermined road speed will eliminate side thrust forces acting on the wheels and will thereby increase tire life and reduce tire wear. Since the adjustment for wheel tracking is made under dynamic conditions, it will also be apparent that at static conditions the wheels will exhibit some degree of toe-in or toe-out, depending on the vehicle steering geometry. However, setting the toe-in, at dynamic conditions eliminates the guess-work in setting the toe-in or toe-out at static conditions.

Numerous variations and modifications may obviously be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. A method for paralleling the track of the front wheels of a motor vehicle at highway speeds, comprising the steps of
    orienting the motor vehicle on a horizontal surface,
    placing the front wheels of the motor vehicle in contact with a pair of spaced drums adapted for common limited lateral movement on a drive shaft, said drums adapted for common lateral movement by means of a non-extensible connecting means holding said drums in a spaced relationship,
    adjusting the caster of the front wheels to a common value,
    aligning the axis of the front wheels vertically over the axis of said drive shaft,
    rotating said spaced pair of drums together on said drive shaft for driving the front wheels at an rpm equal to average highway speed,
    determining any condition of divergence of the track of the front wheels from a parallel relationship at said highway speed by determining the tension or compression forces exerted on said connecting means by said spaced drums as a result of side thrust forces excited by said wheels at said highway speed, and
    adjusting the relative track of the front wheels to a parallel relationship while the wheels are rotating at said highway speed.

2. Apparatus for determining any condition of divergence of the track of the front wheels of a motor vehicle from a parallel relationship at highway speeds, comprising
    ramp means for orienting the motor vehicle on a horizontal surface,
    pointer means for indicating any difference in the relative caster of the front wheels of the motor vehicle,
    a pair of spaced drums mounted for rotation on a drive shaft and adapted for common lateral movement along said drive shaft,
    means for securing the motor vehicle in a fixed position with the front wheels in contact with said spaced drums, said means being adjustable to vertically orient the axis of the wheels with the axis of said drive shaft,
    drive means for rotating said drive shaft and said spaced pair of drums for driving the front wheels at an rpm equal to average highway speed,
    connecting means disposed between said spaced drums for retaining said drums in a spaced relationship during rotation and providing for common lateral movement of said drums, and
    detecting means cooperating with said connecting means for detecting tension or compression forces in said connecting means as a result of side thrust forces exerted on said spaced drums by the wheels being rotated at said highway speed for determining any divergence from parallel of the track of the front wheels.

3. The apparatus as described in claim 2, wherein said drive means comprises
    a pulley attached to said drive shaft,
    a variable speed electric motor,
    a gear box attached to the output shaft of said electric motor, said gear box having an output shaft and a drive pulley mounted thereon, and
    a drive belt interconnecting said gear box drive pulley and the pulley attached to said drum drive shaft.

4. The apparatus as described in claim 2, wherein said connecting means comprises
    a pair of spaced sleeves encircling said drive shaft and attached to said spaced drums for rotating therewith,
    a pair of spaced brackets each journaled on one of said sleeves for allowing the sleeve to rotate within said bracket, and
    at least one bar interconnecting said spaced brackets and adapted for holding said brackets fixed with relation to said rotating sleeves and maintaining said drums in a spaced relationship.

5. The apparatus as described in claim 4, wherein said detecting means comprises
    force measuring means attached to said at least one bar for detecting tension or compression forces in said bar resulting from any side thrust forces exerted on said rotating spaced drums by said wheels, and
    indicating means connected to said force measuring means for indicating the presence of said tension or compression forces in said bar for indicating divergence from parallel of the track of the front wheels while traveling at highway speed.

6. The apparatus as described in claim 5, wherein said indicating means comprises a gauge indicator for indicating the pressure of compression or tension forces measured by said force measuring means.

7. The apparatus as described in claim 2, wherein said pointer means for indicating any difference in the relative caster of the front wheels of the motor vehicle comprises a pair of spaced, vertically extensible indicators oriented in the vertical plane passing through said drum drive shaft and located on opposite sides of said motor vehicle for alignment with the axis of the axle of each of the front wheels, any misalignment of one of the indicators with its respective wheel axle indicating a difference in relative caster of the front wheels.

8. The apparatus as described in claim 2, wherein said spaced drums are mounted for rotation on said drive shaft and adapted for lateral movement along the drive shaft by a combination ball bearing key and race means comprising
- a plurality of slots axially disposed along the surface of said drive shaft,
- a plurality of axial slots and cylindrical bores disposed in drive shaft accommodating hubs of said drums, said axial slots and bores radially spaced for communication with respective ones of said axial slots in said drive shaft, and
- a plurality of ball bearings disposed in said communicating axial slots of said drum hubs and said drive shaft and said cylindrical bore for acting as a key in said communicating slots of said hub and drive shaft for locking said drum hub in relation to said drive shaft during rotation but permitting said ball bearings to circulate through said aligned axial slots of said drum hub and said drive shaft and said communicating circular bore for permitting lateral movement of said drum axially along said drive shaft.

9. Apparatus for determining any condition of divergence of the track of the front wheels of a motor vehicle from a parallel relationship at highway speeds, comprising
- ramp means for orienting the motor vehicle on a horizontal surface,
- pointer means for indicating any difference in the relative caster of the front wheels of the motor vehicle,
- a pair of spaced drums mounted for rotation on a drive shaft and adapted for common lateral movement along said drive shaft,
- means for securing the motor vehicle in a fixed position with the front wheels in contact with said spaced drums, said means being adjustable to vertically orient the axis of the wheels with the axis of said drive shaft,
- drive means for rotating said drive shaft and said spaced pair of drums for driving the front wheels at an rpm equal to average highway speed,
- a pair of spaced sleeves encircling said drive shaft and attached to said spaced drums for rotating therewith,
- a pair of spaced brackets each journaled on one of said sleeves for allowing the sleeve to rotate within said bracket,
- at least one bar interconnecting said spaced brackets and adapted for holding said brackets fixed with relation to said rotating sleeves and maintaining said drums in a spaced relationship,
- force measuring means attached to said at least one bar for detecting tension or compression forces in said bar resulting from any side thrust forces exerted on said rotating spaced drums by said wheels, and
- indicating means connected to said force measuring means for indicating the presence of said tension or compression forces in said bar for indicating divergence from parallel of the track of the front wheels while traveling at highway speed.

10. The apparatus as described in claim 9, wherein said drive means comprises
- a pulley attached to said drive shaft,
- a variable speed electric motor,
- a gear box attached to the output shaft of said electric motor, said gear box having an output shaft and a drive pulley mounted thereon, and
- a drive belt interconnecting said gear box drive pulley and the pulley attached to said drum drive shaft.

11. The apparatus as described in claim 9, wherein said indicating means comprises a gauge indicator for indicating the pressure of compression or tension forces measured by said force measuring means.

12. The apparatus as described in claim 9, wherein said pointer means for indicating any difference in the relative caster of the front wheels of the motor vehicle comprises a pair of spaced, vertically extensible indicators oriented in the vertical plane passing through said drum drive shaft and located on opposite sides of said motor vehicle for alignment with the axis of the axle of each of the front wheels, any misalignment of one of the indicators with its respective wheel axle indicating a difference in relative caster of the front wheels.

13. The apparatus as described in claim 9, wherein said spaced drums are mounted for rotation on said drive shaft and adapted for lateral movement along the drive shaft by a combination ball bearing key and race means comprising
- a plurality of slots axially disposed along the surface of said drive shaft,
- a plurality of axial slots and cylindrical bores disposed in drive shaft accommodating hubs of said drums, said axial slots and bores radially spaced for communication with respective ones of said axial slots in said drive shaft, and
- a plurality of ball bearings disposed in said communicating axial slots of said drum hubs and said drive shaft and said cylindrical bore for acting as a key in said communicating slots of said hub and drive shaft for locking said drum hub in relation to said drive shaft during rotation but permitting said ball bearings to circulate through said aligned axial slots of said drum hub and said drive shaft and said communicating circular bore for permitting lateral movement of said drum axially along said drive shaft.

* * * * *

UNITED STATES PATENT OFFICE
CERTIFICATE OF CORRECTION

Patent No. 3,897,636   Dated August 5, 1975

Inventor(s) Joseph V. LeBlanc

It is certified that error appears in the above-identified patent and that said Letters Patent are hereby corrected as shown below:

Page 1, change the inventor's surname from "Leblanc" to -- LeBlanc -- .

Column 5, line 65, change "in " to -- in -- .

Column 6, line 44, after "12" insert -- and therefore -- .

Column 7, line 14, before "caster" insert -- relative -- .

Column 7, line 15, delete "to a predetermined value" and substitute therefor -- in order that they will have an equal caster value -- .

Column 7, line 16, delete "relative" .

Column 7, line 24, change "setting" to -- adjusting --

Column 7, line 24, after "toe-out" insert -- adjustment sleeve -- .

Column 7, line 34, delete "setting the toe-in" and substitute therefor -- paralleling the front wheels -- .

Signed and Sealed this twenty-seventh Day of January 1976

[SEAL]

Attest:

RUTH C. MASON
*Attesting Officer*

C. MARSHALL DANN
*Commissioner of Patents and Trademarks*